United States Patent
Reddy

[19]

[11] Patent Number: 6,098,601
[45] Date of Patent: Aug. 8, 2000

[54] FUEL VAPOR STORAGE AND RECOVERY APPARATUS AND METHOD

[75] Inventor: Sam Raghuma Reddy, West Bloomfield, Mich.

[73] Assignee: General Motors Corporation, Detroit, Mich.

[21] Appl. No.: 09/197,758

[22] Filed: Nov. 23, 1998

[51] Int. Cl.$^7$ .................................................. F02N 370/04
[52] U.S. Cl. ........................................... 123/520; 123/557
[58] Field of Search .................................... 123/520, 521, 123/518, 519, 516, 557; 96/146, 144

[56] References Cited

U.S. PATENT DOCUMENTS

| | | | |
|---|---|---|---|
| 3,734,293 | 5/1973 | Biskis | 210/185 |
| 4,706,636 | 11/1987 | Davis | 123/557 |
| 4,732,588 | 3/1988 | Covert et al. | 96/144 |
| 4,846,135 | 7/1989 | Tiphaine | 123/557 |
| 4,919,103 | 4/1990 | Ishiguro | 123/557 |
| 4,933,093 | 6/1990 | Keller | 123/577 |
| 5,251,592 | 10/1993 | Seki | 123/520 |
| 5,275,144 | 1/1994 | Gross | 123/520 |
| 5,474,047 | 12/1995 | Cochard | 123/520 |

*Primary Examiner*—Carl S. Miller
*Attorney, Agent, or Firm*—Karl F. Barr, Jr.; Patrick M. Griffin

[57] ABSTRACT

A fuel vapor storage and recovery apparatus including a fuel vapor storage canister having an atmospheric vent port, a control valve for opening and closing the atmospheric vent port, a fuel vapor adsorbent material in the vapor storage canister, a vapor/purge conduit between the vapor storage canister and a fuel tank, and a heater operative to heat the vapor adsorbent material. With the atmospheric vent port open, a fuel vapor/air mixture is expelled from the fuel tank into the vapor storage canister. A fuel vapor fraction of the fuel vapor/air mixture adsorbs in the pores of the adsorbent material while an air fraction of the mixture escapes through the atmospheric vent port. When the control valve closes the atmospheric vent port, the heater heats the body of adsorbent material to a purge temperature above an ambient temperature in the fuel tank. At the purge temperature, the adsorbed fuel desorbs and fills the storage canister with large volume of hot gaseous vapor. The resulting increased pressure in the vapor storage canister expels the hot vapor through the vapor/purge conduit back into the fuel tank where it condenses at the lower ambient temperature therein.

11 Claims, 2 Drawing Sheets

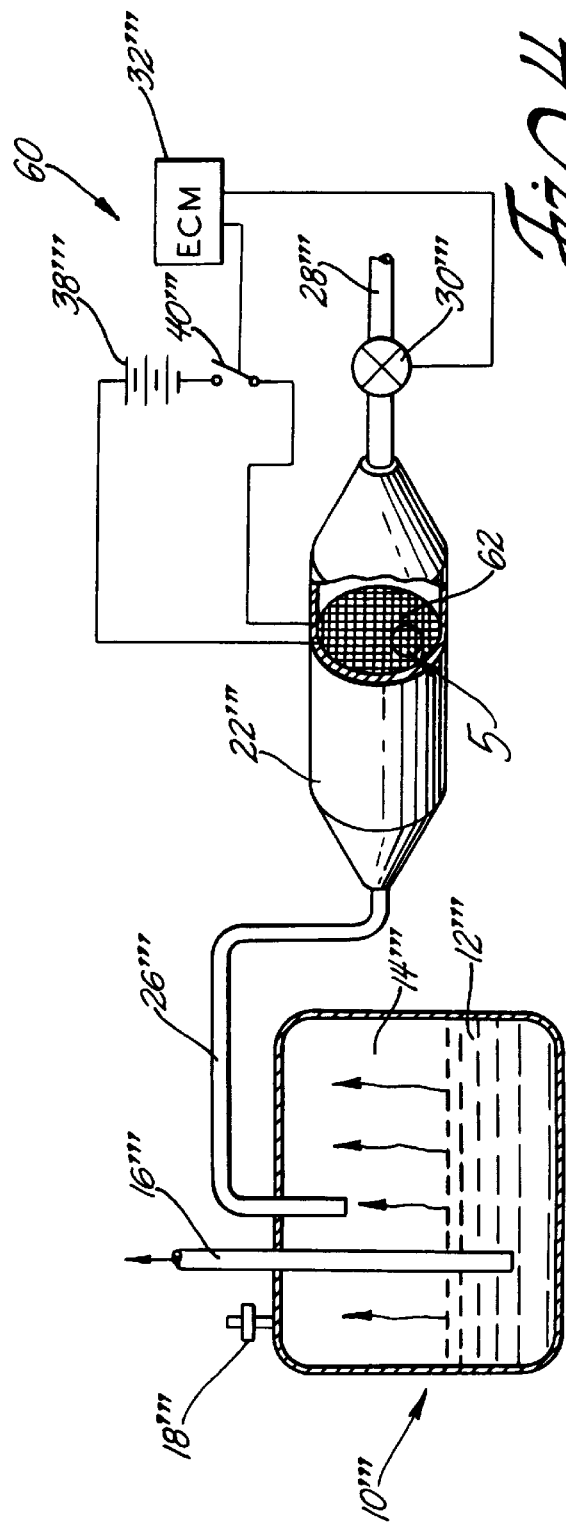
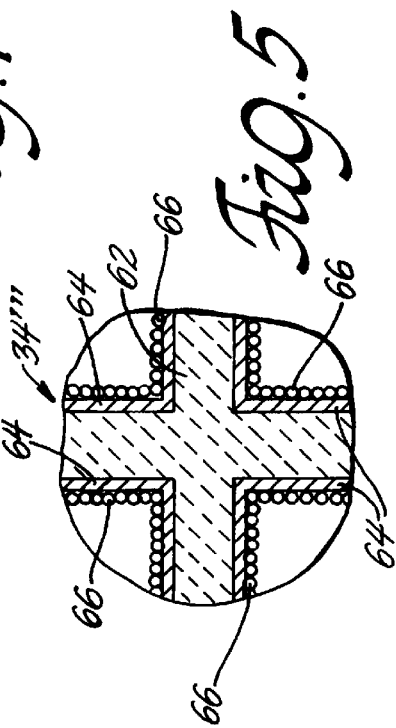

FUEL VAPOR STORAGE AND RECOVERY APPARATUS AND METHOD

TECHNICAL FIELD

This invention relates to a motor vehicle fuel vapor storage and recovery apparatus and method.

BACKGROUND OF THE INVENTION

U.S. Pat. No. 4,732,588, issued May 22, 1988 and assigned to the assignee of this invention describes a motor vehicle fuel vapor storage and recovery apparatus including a fuel vapor storage canister, an atmospheric vent port on the storage canister, a body of fuel vapor adsorbent material such as activated carbon granules in the canister, a vapor conduit, a purge conduit, and a thermoelectric cooler/heater. A fuel vapor/air mixture is expelled from a fuel tank of the motor vehicle and conducted to the vapor storage canister through the vapor conduit where it circulates through the body of adsorbent material toward the atmospheric vent port. The fuel vapor fraction of the fuel vapor/air mixture adsorbs in the pores of the adsorbent material while the air fraction of the mixture escapes through the atmospheric vent port. The purge conduit is connected to the vapor storage canister and to a source of vacuum such as an intake manifold of an internal combustion engine. When the vapor conduit is closed by a control valve, a pressure gradient between the atmosphere and the intake manifold induces a flow of air into the vapor storage canister through the vent port. The in-flowing air desorbs the fuel from the pores of the adsorbent material and the resulting fuel vapor/air mixture is purged from the vapor storage canister through the purge duct and consumed in the engine. Fuel vapor adsorption and desorption are analogous to condensation and vaporization. Accordingly, adsorbed vapor will be referred to herein as liquid fuel in the pores of the adsorbent material. The thermoelectric cooler/heater cools the vapor conduit to promote condensation of fuel vapor from the fuel tank and heats the body of adsorbent material to promote vaporization of the liquid fuel therefrom. Purging by vacuum into an internal combustion engine complicates control of the engine because the concentration of fuel vapor in the purged fuel vapor/air mixture varies. When the propulsion system of the motor vehicle includes a fuel cell, successfully vacuum purging a fuel vapor/air mixture into the fuel cell fuel stream is difficult because the variable concentration of fuel vapor in the fuel vapor/air mixture adversely affects the operation of certain fuel cell components. A fuel vapor storage and recovery apparatus and method according to this invention is a novel alternative to the vapor storage and recovery apparatus described in the aforesaid U.S. Pat. No. 4,732,588.

SUMMARY OF THE INVENTION

This invention is a new and improved motor vehicle fuel vapor storage and recovery apparatus and method including a fuel vapor storage canister, an atmospheric vent port on the vapor storage canister, a control valve for opening and closing the atmospheric vent port, a body of fuel vapor adsorbent material such as activated carbon granules in the vapor storage canister, a vapor/purge conduit between the vapor storage canister and a fuel tank of the motor vehicle, and a heater operative to selectively heat the body of vapor adsorbent material in the vapor storage canister. With the atmospheric vent port open, a fuel vapor/air mixture is expelled from the fuel tank into the vapor storage canister through the vapor/purge conduit when the pressure in the fuel tank exceeds atmospheric pressure and/or when new fuel enters the fuel tank during refueling. A fuel vapor fraction of the fuel vapor/air mixture collects on the adsorbent material as liquid fuel in the pores of the adsorbent material while an air fraction of the mixture escapes through the atmospheric vent port. When the control valve closes the atmospheric vent port, the heater heats the body of adsorbent material to a purge temperature above an ambient temperature in the fuel tank. At the purge temperature, liquid fuel in the pores of the adsorbent material vaporizes and fills the storage canister with hot vapor. The resulting increased pressure in the vapor storage canister expels the hot vapor through the vapor/purge conduit back into the fuel tank where it condenses at the lower ambient temperature therein.

BRIEF DESCRIPTION OF THE DRAWINGS

FIG. 4 is a schematic view of a third modified embodiment of the fuel vapor storage and recovery apparatus according to this invention; and FIG. 5 is an enlarged view of the portion of FIG. 4 identified by the reference circle 5 in FIG. 4.

DESCRIPTION OF THE PREFERRED EMBODIMENT

Figure 1:
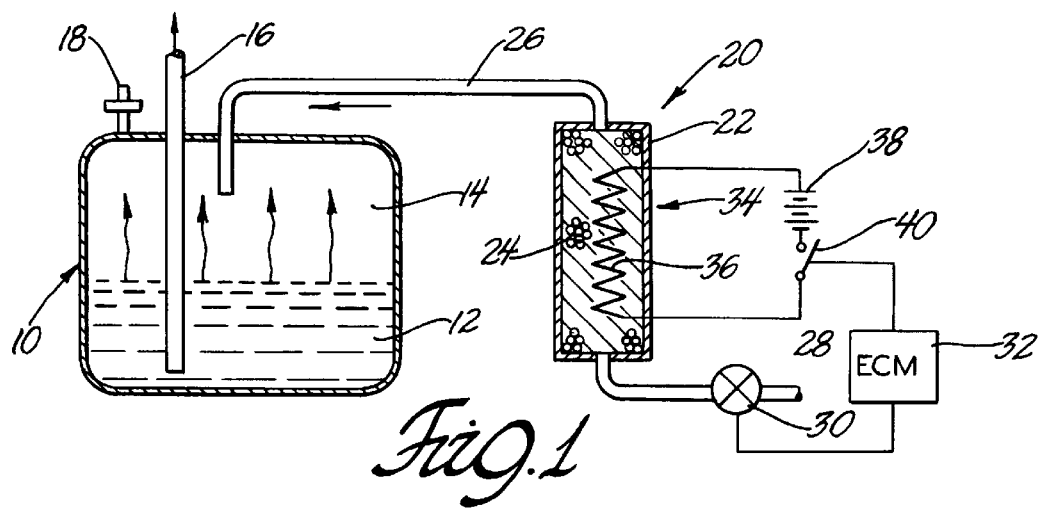
FIG. 1 is a schematic view of a fuel vapor storage and recovery apparatus according to this invention.

Referring to FIG. 1, a motor vehicle, not shown, includes a fuel tank 10 having a variable volume of liquid fuel 12 therein, e.g. gasoline or methanol, and a variable volume of a fuel vapor/air mixture 14 above the liquid fuel. Liquid fuel is delivered from the fuel tank 10 to an internal combustion engine or a fuel processor of a fuel cell, not shown, through a fuel delivery pipe 16. A pressure relief valve 18 on the fuel tank is closed except when the pressure of the fuel vapor/air mixture 14 exceeds a predetermined maximum magnitude.

A fuel vapor storage and recovery apparatus 20 according to this invention includes a vapor storage canister 22 having therein a body of fuel vapor adsorbent material 24 such as activated carbon granules. The vapor storage canister 22 communicates with the fuel tank 10 above the liquid fuel 12 therein through a vapor/purge conduit 26. The vapor storage canister 22 communicates with the surrounding atmosphere through an atmospheric vent port 28. A control valve 30 opens and closes the atmospheric vent port 28 and is, in turn, controlled by an electronic control module ("ECM") 32 on the motor vehicle. A heater 34 in the form of an electric heating element 36 is disposed in the vapor storage canister 22 and connected to a source of electrical energy such as a battery 38 of the motor vehicle. A switch 40 controlled by the ECM 32 turns the heater 34 on and off.

In operation, when the control valve 30 opens the atmospheric vent port 28 on the vapor storage canister 22 while the heater 34 is turned off, a pressure gradient between the fuel tank 10 and the atmosphere surrounding the vapor storage canister expels a fraction of the fuel vapor/air mixture 14 from the fuel tank into the vapor storage canister through the vapor/purge conduit 26. The pressure gradient may be attributable to a thermally induced increase in the concentration of vapor in the fuel vapor/air mixture 14 or to the entry of new fuel into the fuel tank during refueling. In either circumstance, the fuel vapor/air mixture expelled through the vapor/purge conduit 26 circulates toward the atmospheric vent port 28 through the body of adsorbent material 24 in the vapor storage canister. During such circulation, the fuel vapor fraction of the fuel vapor/air mixture collects on the adsorbent material as liquid fuel in the pores of the adsorbent material while the air fraction of the mixture escapes through the atmospheric vent port so that substantially no fuel vapor is released into the atmosphere.

At selected intervals, the ECM 32 purges the body of vapor adsorbent material 24 in the vapor storage canister by causing the switch 40 to turn on the heater 34 and by causing the control valve 30 to close the atmospheric vent port 28. In that circumstance, the heating element 36 heats the body of adsorbent material 24 to a purge temperature which is calculated to always exceed the ambient temperature prevailing in the fuel tank 10. At the purge temperature, the liquid fuel in the pores of the adsorbent material is converted to a large volume of gaseous hot vapor which fills the vapor storage canister. The pressure in the vapor storage canister 22 increases to a pressure above the pressure of the fuel vapor/air mixture 14 in the fuel tank. The resulting pressure gradient expels hot fuel vapor which is substantially free of entrained air from the vapor storage canister 22 through the vapor/purge conduit 26 back into the fuel tank 10. At the lower ambient temperature prevailing in the fuel tank, the expelled hot fuel vapor condenses in the fuel tank to liquid fuel which then unites with the liquid fuel 12 already in the fuel tank. The pressure relief valve 18 on the fuel tank limits the pressure of the fuel vapor/air mixture 14 therein to a maximum magnitude compatible with the structural integrity of the fuel tank.

In tests of an experimental fuel vapor storage and recovery apparatus according to this invention, purge temperatures of about 320° F. and 350° F. for methanol and for gasoline, respectively, were observed to satisfactorily purge a body of activated carbon adsorbent material with only negligible escape of fuel vapor through the pressure relief valve 18. Importantly, the vapor storage canister 22 is purged independently of the propulsion system of the motor vehicle so that the above referenced negative effects of the variable concentration of fuel vapor in the purged fuel vapor/air mixture are completely avoided. In addition, the vapor storage canister can be purged anytime, regardless of whether the propulsion system of the motor vehicle is in operation.

Figure 2:
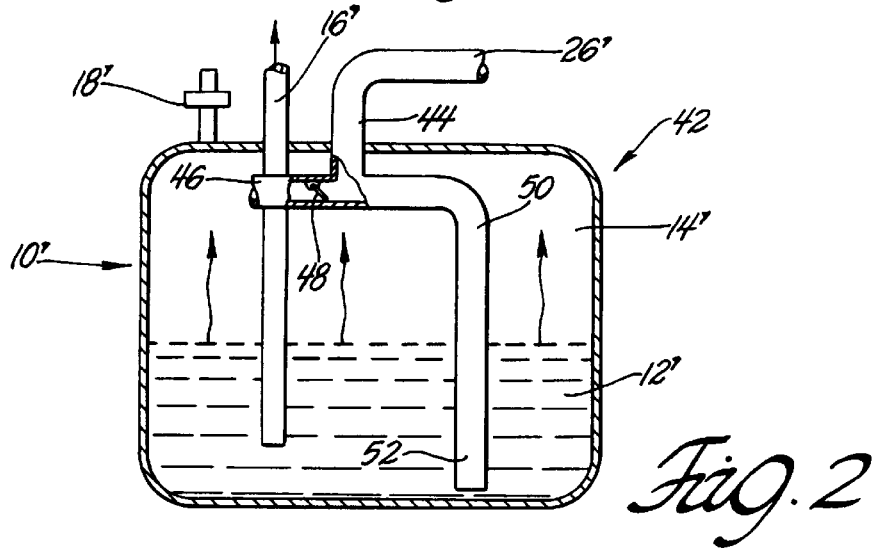
FIG. 2 is a schematic view of a first modified embodiment of the fuel vapor storage and recovery apparatus according to this invention.

A first modified fuel vapor storage and recovery apparatus 42 according to this invention is fragmentarily illustrated in FIG. 2 in which structural elements common to the fuel vapor storage and recovery apparatus 20 are identified by primed reference characters. The first modified fuel vapor storage and recovery apparatus 42 includes a vapor/purge conduit 26' having an end 44 in a fuel tank 10'. The end 44 of the vapor/purge conduit 26' is connected to a first branch 46 which communicates with the fuel vapor/air mixture 14' above the liquid fuel 12' in the fuel tank. A check valve 48 in the first branch 46 between the fuel vapor/air mixture 14' and the end 44 of the vapor/purge conduit prevents backflow of fuel vapor into the fuel tank through the first branch. The end 44 of the vapor/purge conduit 26' is also connected to a second branch 50 having an end 52 always submerged in the liquid fuel 12' in the fuel tank.

A fraction of the fuel vapor/air mixture 14' in the fuel tank is expelled from the fuel tank through the first branch 46 and the vapor/purge conduit 26' when the pressure thereof exceeds atmospheric pressure and the atmospheric vent port on the vapor storage canister is open. To purge the vapor storage canister, the atmospheric vent port thereon is closed and the body of adsorbent material therein is heated to the purge temperature. The liquid fuel in the pores of the adsorbent material is converted to a large volume of gaseous hot vapor which fills the vapor storage canister. The pressure in the vapor storage canister increases above the pressure of the fuel vapor/air mixture 14' in the fuel tank. Hot fuel vapor which is substantially free of entrained air is then expelled from the vapor storage canister through the vapor/purge conduit 26'. The hot fuel vapor is blocked by the check valve 48 from entering the fuel tank through the first branch 46 and instead is forced into the liquid fuel 12' through the second branch 50. The hot fuel vapor condenses directly in the relatively cold liquid fuel 12' and thereby minimizes the effect of the expelled vapor on the pressure of the fuel vapor/air mixture 14' in the fuel tank.

Figure 3:
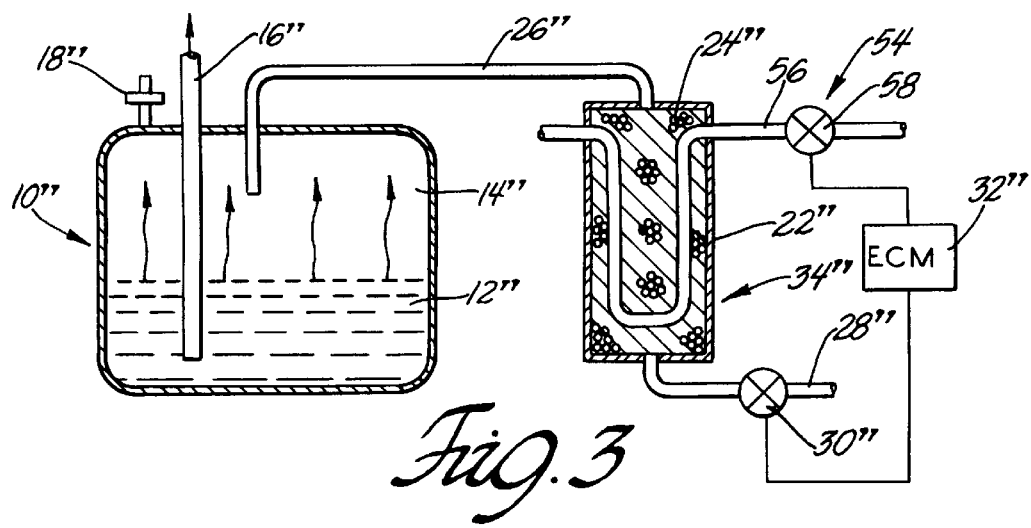
FIG. 3 is a schematic view of a second modified embodiment of the fuel vapor storage and recovery apparatus according to this invention.

A second modified fuel vapor storage and recovery apparatus 54 according to his invention is schematically illustrated in FIG. 3 in which structural elements common to the fuel vapor storage and recovery apparatus 20 are identified by double primed reference characters. The second modified fuel vapor storage and recovery apparatus 54 includes a vapor storage canister 22" having therein a body of fuel vapor adsorbent material 24". The vapor storage canister 22" communicates with a fuel tank 10" through a vapor/purge conduit 26". The vapor storage canister 22" communicates with the surrounding atmosphere through an atmospheric vent port 28". A control valve 30" opens and closes the atmospheric vent port 28" and is, in turn, controlled by an ECM 32" on the motor vehicle. A heater 34" in the form of waste heat fluid conduit 56 is disposed in the vapor storage canister 22" and connected to a source of waste heat, not shown, on the motor vehicle such as the cooling water circuit of an internal combustion engine or a fuel processor for a fuel cell. A heater valve 58 controlled by the ECM 32" opens and closes the waste heat fluid conduit 56.

In operation, when the control valve 30" opens the atmospheric vent port 28" on the vapor storage canister 22" with the waste heat fluid conduit 56 closed, a pressure gradient between the fuel tank 10" and the atmosphere surrounding the vapor storage canister expels a fraction of a fuel vapor/air mixture 14" in the fuel tank into the vapor storage canister through the vapor/purge conduit 26". The expelled fuel vapor/air mixture circulates toward the atmospheric vent port 28" through the body of adsorbent material 24" in the vapor storage canister. The body of adsorbent material traps the fuel vapor while only air escapes through the atmospheric vent port.

At selected intervals, the ECM 32" purges the body of vapor adsorbent material in the vapor storage canister by causing the heater control valve 58 to open the waste heat fluid conduit 56 and by causing the control valve 30" to close the atmospheric vent port 28". In that circumstance, the waste heat fluid conduit heats the body of adsorbent material 24" to the purge temperature whereat the liquid fuel in the pores of the adsorbent material vaporizes and fills the vapor storage canister with hot fuel vapor. The liquid fuel in the pores of the adsorbent material is converted to a large volume of gaseous hot vapor which fills the vapor storage canister. The resulting pressure gradient expels hot fuel vapor which is substantially free of entrained air from the vapor storage canister 22" through the vapor/purge conduit 26" back into the fuel tank 10" where it condenses to liquid fuel.

A third modified fuel vapor storage and recovery apparatus 60 according to his invention is schematically illustrated in FIGS. 4–5 in which structural elements common to the fuel vapor storage and recovery apparatus 20 are identified by triple primed reference characters. The third modified fuel vapor storage and recovery apparatus 60 includes a vapor storage canister 22''' having therein a ceramic honeycomb 62 and a heater 34''' in the form of an electrically conductive substrate 64 on the honeycomb below a coating 66 of fuel vapor adsorbent material, FIG. 5. The storage canister 22''' communicates with a fuel tank 10''' through a vapor/purge conduit 26''' and with the surrounding atmosphere through an atmospheric vent port 28'''. A control valve 30''' opens and closes the atmospheric vent port 28''' and is, in turn, controlled by an ECM 32'''. The electrically conductive substrate 64 is connected to a source of electrical energy such as a battery 38''' of the motor vehicle. A switch 40''' controlled by the ECM 32''' turns the heater 34''' on and off.

In operation, when the control valve 30''' opens the atmospheric vent port 28''' on the vapor storage canister 22''' with the heater 34''' turned off, a pressure gradient between the fuel tank 10''' and the atmosphere surrounding the vapor storage canister expels a fraction of a fuel vapor/air mixture 14''' in the fuel tank 10''' into the vapor storage canister through the vapor/purge conduit 26'''. The expelled fuel vapor/air mixture circulates through the honeycomb 62 toward the atmospheric vent port 28'''. The coating 66 of adsorbent material on the honeycomb traps the fuel vapor while only air escapes through the atmospheric vent port.

At selected intervals, the ECM 32''' purges the coating 66 of vapor adsorbent material on the honeycomb 62 by causing the switch 40''' to turn on the heater 34''' and by causing the control valve 30''' to close the atmospheric vent port 28'''. In that circumstance, the electrically conductive substrate 64 heats the coating 66 of adsorbent material to the purge temperature whereat the liquid fuel in the pores of the adsorbent material is converted to a large volume of gaseous hot vapor which fills the vapor storage canister. The pressure in the vapor storage canister 22''' increases to a pressure above the pressure of the fuel vapor/air mixture 14''' in the fuel tank. The resulting pressure gradient expels hot fuel vapor which is substantially free of entrained air from the vapor storage canister 22''' through the vapor/purge conduit 26''' back into the fuel tank 10''' where it condenses to liquid fuel.

Having thus described the invention, what is claimed is:

1. A method of storing and recovering fuel vapor in a fuel vapor/air mixture in a fuel tank of a motor vehicle comprising the steps of:

conducting a fraction of the fuel vapor/air mixture from the fuel tank to an adsorbent material in a vapor storage canister, adsorbing on the adsorbent material a fuel vapor fraction of the fuel vapor/air mixture and expelling to the atmosphere through an atmospheric vent port on the vapor storage canister an air fraction of the fuel vapor/air, closing the atmospheric vent port, heating the adsorbent material in the vapor storage canister to a purge temperature exceeding an ambient temperature in the fuel tank to fill the vapor storage canister with hot fuel vapor at a pressure above the pressure of the fuel vapor/air mixture in the fuel tank, conducting the hot fuel vapor from the vapor storage canister into the fuel tank, and condensing the hot fuel vapor to liquid in the fuel tank.

2. The method of storing and recovering fuel vapor in a fuel vapor/air mixture in a fuel tank of a motor vehicle recited in claim 1 wherein:

the purge temperature is in a range of between 300° F. and 400° F.

3. The method of storing and recovering fuel vapor in a fuel vapor/air mixture in a fuel tank of a motor vehicle recited in claim 2 wherein the step of heating the adsorbent material in the vapor storage canister comprises:

forming an electric heating element in the vapor storage canister in contact with the adsorbent material therein, and turning the heating element on and off by selectively connecting the electric heating element to a source of electrical energy.

4. The method of storing and recovering fuel vapor in a fuel vapor/air mixture in a fuel tank of a motor vehicle recited in claim 2 wherein the step of heating the adsorbent material in the vapor storage canister comprises:

forming in the vapor storage canister a waste heat fluid conduit in contact with the adsorbent material in the vapor storage canister, and selectively connecting the waste heat fluid conduit to a source on the motor vehicle of waste heat fluid.

5. The method of storing and recovering fuel vapor in a fuel vapor/air mixture in a fuel tank of a motor vehicle recited in claim 2 wherein the step of condensing the hot fuel vapor to liquid in the fuel tank comprises:

introducing the hot fuel vapor into the fuel tank below the level of liquid fuel in the fuel tank.

6. A fuel vapor storage and recovery apparatus for a motor vehicle having a fuel tank with a fuel vapor/air mixture therein above a liquid fuel in the fuel tank comprising:

a vapor storage canister having a fuel vapor adsorbent material therein and an atmospheric vent port, a control valve selectively operable to open and close the atmospheric vent port, a first conduit means operative to conduct a fraction of the fuel vapor/air mixture from the fuel tank to the vapor storage canister when the atmospheric vent port is open so that a fuel vapor fraction of the fuel vapor/air mixture is adsorbed on the adsorbent material and an air fraction of the fuel vapor/air mixture is expelled to the atmosphere through the open atmospheric vent port, a heater means operative when the atmospheric vent port is closed to heat the adsorbent material to a purge temperature above an ambient temperature in the fuel tank at which purge temperature the adsorbed fuel vapor fraction of the fuel vapor/air mixture vaporizes and fills the vapor storage canister with hot fuel vapor at a pressure above the pressure of the fuel vapor/air mixture in the fuel tank, and a second conduit means operative to conduct the hot fuel vapor from the vapor storage canister to the fuel tank wherein the hot fuel vapor condenses to liquid fuel at the ambient temperature in the fuel tank.

7. The fuel vapor storage and recovery apparatus for a motor vehicle recited in claim 6 wherein each of the first and the second conduit means comprises:

a common vapor/purge conduit having a first end connected to the fuel tank and a second end connected to the vapor storage canister.

8. The fuel vapor storage and recovery apparatus for a motor vehicle recited in claim 7 wherein:

the purge temperature is in a range of between 300° F. and 400° F.

9. The fuel vapor storage apparatus for a motor vehicle recited in claim 8 wherein the heater means comprises:

an electric heating element in the vapor storage canister in contact with the adsorbent material therein, a source of electrical energy, and a switch means operative to selectively connect the electric heating element to the source of electrical energy.

10. The fuel vapor storage apparatus for a motor vehicle recited in claim 8 wherein the heater means comprises:

a waste heat fluid conduit in the vapor storage canister in contact with the adsorbent material therein, a source on the motor vehicle of waste heat fluid, and a control valve means operative selectively connect the waste heat fluid conduit to the source of waste heat fluid.

11. A fuel vapor storage and recovery apparatus for a motor vehicle having a fuel tank with a fuel vapor/air mixture therein above a liquid fuel in the fuel tank comprising:

a vapor storage canister having a honeycomb therein with a coating of a fuel vapor adsorbent material thereon and an atmospheric vent port, a control valve selectively operable to open and close the atmospheric vent port, a vapor/purge conduit operative to conduct a fraction of the fuel vapor/air mixture from the fuel tank to the vapor storage canister when the atmospheric vent port is open so that a fuel vapor fraction of the fuel vapor/air mixture is adsorbed on the adsorbent material and an air fraction of the fuel vapor/air mixture is expelled to the atmosphere through the open atmospheric vent port, an electrically conductive substrate between the honeycomb and the coating of fuel vapor adsorbent material thereon, a source of electrical energy, and a switch operative to selectively connect the source of electrical energy to the electrically conductive substrate so that the electrically conductive substrate defines a heater operative when the atmospheric vent port is closed to heat the coating of adsorbent material to a purge temperature above an ambient temperature in the fuel tank at which purge temperature the adsorbed fuel vapor fraction of the fuel vapor/air mixture vaporizes and fills the vapor storage canister with hot fuel vapor at a pressure above the pressure of the fuel vapor/air mixture in the fuel tank, the hot fuel vapor being conducted through the vapor/purge conduit to the fuel tank wherein the hot fuel vapor condenses to liquid fuel at the ambient temperature in the fuel tank.

* * * * *